United States Patent [15] 3,691,273
Marcarian et al. [45] Sept. 12, 1972

[54] LIQUID COSMETIC PRODUCT FOR FILLING APPLICATOR APPLIANCES AND ITS METHOD OF PREPARATION

[72] Inventors: Jean Hrand Marcarian, Paris; Roland Louis Julien Clemencet, Suresnes, both of France

[73] Assignee: L'Oreal, Paris, France

[22] Filed: April 28, 1970

[21] Appl. No.: 32,722

[30] Foreign Application Priority Data

Feb. 17, 1970 France..................7005646

Related U.S. Application Data

[63] Continuation-in-part of Ser. No. 644,290, June 6, 1967, abandoned.

[52] U.S. Cl.................................................424/63
[51] Int. Cl..............................................A61k 7/02
[58] Field of Search..........................................424/63

[56] References Cited

OTHER PUBLICATIONS

F. J. Prescott et al., Drug and Cosmetic Industry, Vol. 93 Nos. 4 and 5, pp. 443– 445, 540– 541, 629, 630, 702, 739 (1963).
Atlas Chemical Industries Cosmetic Bulletin No. LD93, p. 1, 1961.

Primary Examiner—Albert T. Meyers
Assistant Examiner—Norman A. Drezin
Attorney—Browdy and Neimark

[57] ABSTRACT

The method of preparing a liquid cosmetic product is characterized in that finely crushed pigments are mixed with high organic polymers while dispersing them by means of a fatty oxyethylenated body, to the colloidal mass obtained are added polyols of low molecular weight in aqueous solution, then to the suspension thus obtained and kept in movement, the solution of polar compound is added.

5 Claims, No Drawings

LIQUID COSMETIC PRODUCT FOR FILLING APPLICATOR APPLIANCES AND ITS METHOD OF PREPARATION

This is a continuation-in-part of application Ser. No. 644,290, filed June 6, 1967 now abandoned. The present invention relates to an eye-liner for make-up, and its method of preparation.

Eye-liners are known for applying to the eyelid with a brush, but none of them are able to be used in a container appliance provided with a wick.

The present invention obviates the above-mentioned disadvantage by creating an eye-liner for filling applicator appliances, themselves forming containers or able to be refilled, resulting from a preparation process enabling the passage of the liquid product or eye-liner through a wick which forms part of a container applicator.

For passing a liquid product through a wick applicator, the following characteristics must be taken into account, namely:

1. Fluidity: The product must be sufficiently fluid to make possible passing the product through the wick of an applicator and yet viscous enough to prevent said product from flowing or spreading away.

2. Drying: It must dry rapidly on the skin without definitely obstructing the tracing point when eventually exposed for a moment to the open air. The liquid concentrated by evaporation on the wick must be re-dissolved by the arrival of the fresh product coming from the retaining container.

3. Polarity: It must be the same as that of the materials forming the body of the applicator device and porous bodies utilized, so that the pigments contained in the eye-liner product do not have a tendency to agglomerate on the surfaces.

4. Sedimentation: It must be limited to avoid, in every possible way, the forming of deposits or clots, either directly in the body of the applicator appliance, or in the ducts of the porous non-return cartridge or of the wick.

The invention creates a preparation process and an eye-liner complying with the above-mentioned requirements.

The eye-liner obtained by means of the preparation process of the invention contains the following ingredients, calculated for 1,000 g of composition:

35 to 150 g of pigments so fine that 90 to 97 percent of them are of about 1 micron size.

8 to 60 g of fatty oxyethylenated alcohol ether, i.e. an ether with oxyethylene chains. 0.4 to 20 g of one or two high organic polymers or copolymers in colloidal solution, for instance, of the type copolymer of 30–70 percent vinyl-pyrrolidone and 70–30 percent of vinyl acetate of M.W. about 40,000–360,000.

50 to 250 g of a high molecular weight polyol, such as polyvinyl alcohol at 5 percent water, the solution being protected by 0.3 percent of monochloracetamide of mono-ethanolamine, for instance. Other polyols which may be used include 2,2dimethylol-propane; triethylene glycol; di-propylene glycol; 2 methyl butyl glycol; and butylene glycol.

0 to 150 g of a low molecular weight polyol, such as propylene glycol.

5 to 25 g of a cationic ester of a high molecular weight alkylolamine, dispersible in water, e.g., N,N,N′,N′-tetrakis (2-hydroxypropyl)ethylene diamine dioleate methosulfate.

5 to 70 g of ethanol, isopropyl alcohol or other suitable solvent.

and lastly, demineralized water, in sufficient quantity for 1,000 g of composition.

From the general composition mentioned above, it is advisable to note that the fatty oxyethylenated alcohol ether contains 2 to 40 molecules of ethylene oxide for an oleic chain primary alcohol, but it is obvious that a fatty alcohol can be used with a shorter or longer chain, saturated or non-saturated, such as myristic, stearic, etc., as well as a condensate comprising 2, 3, 5, 10, 20, 30 or 40 moles of oxide or a mixture of the latter.

The propylene glycol need not appear in the composition, and, accordingly, its quantity is independent of the amount of ethylene oxide condensates and the amount of polyvinyl alcohol and the amount of polyvinyl-pyrrolidone, or its copolymer with the vinyl acetate, the propylene glycol being intended to give flexibility to the deposit formed on the eyelid.

The cationic ester of a high molecular weight alkylolamine is preferably N,N,N′,N′-tetrakis (2-hydroxypropyl) ethylene diamine dioleate methosulfate.

The mineral pigments or lacquers utilized for making the liquid composition (iron oxide, ultramarine blue, chromium oxide, etc.) must have a dimension of particles in the vicinity of 1 micron to satisfy utilization in container applicators.

The pigments utilized in the process of the invention are treated in such a manner that in the state in which they are used (impalpable and dry powder), each grain is surrounded by a colloidal protector (lignosulfonic acid or its derivatives; natural gums such as tragacanth; proteins such as algin, etc., for instance). With demineralized water, these pigments give a dispersion that might lead one to think that it is a soluble coloring material. Nevertheless, these pigments could not comply alone with all necessary requirements so that the eye-liner composition can pass through a wick applicator. Thus, its particles must not show unequally covered surfaces; they must not stain the skin (making up must be an easy matter); they must adhere to the skin during the time the make-up is worn; they must not clog the pores of the applicator by agglomerating, by physiochemical adherence to walls of the porous bodies and even by simple neutralization of charges. Pigments meeting all these requirements are well known and commercially available; these pigments, such as iron oxide, chromium oxide and alcalin sulphoaluminates, are conventionally used in eye makeup products.

There is given below a specific composition of an eye-liner utilized in the operatory method of the process for putting the invention into action, this composition coming within the general composition as mentioned above, and only given by way of non-restrictive example, for carrying out the operatory method.

SPECIFIC EXAMPLE 145 g of micronized pigments, 40 g of a condensate of 20 moles of ethylene oxide on oleic alcohol, 4 g of a solution at 50 percent of a vinyl acetate/vinyl-pyrrolidone copolymer, in ethanol, 80 g of polyvinyl alcohol at 5 percent in water (solution protected by 0.3 percent of monochloracetamide), 132 g of propylene glycol, mann, α-Aminoalkylierung, Verlag Chemie, Weinheim, Germany (1960).

A compound of the formula IV may be obtained by reacting a 4-basic substituted-1,2,3,6-tetrahydropyridine of the formula II, wherein $R_1$ is a protective group for secondary amines, such as acyl, benzyl, carbobenzoxy or carbamoyl, with an o-aminomethyl-phenol of the formula III, and subsequently removing the protective group by well known methods, such as by acid hydrolysis or hydrogenation.

The following examples further illustrate the present invention and will enable others skilled in the art to understand it more completely. It should be understood, however, that the invention is not limited solely to the particular examples given below.

EXAMPLE 1

Preparation of 2-allyl-4a-hydroxy-6-methyl-1,2,3,4,4a,10a-hexahydro-(10H)-benzopyrano-[3,2-c]-pyridine by method A 13.9 gm (0.1 mol) of N-allyl-piperidone-4 and 7.1 gm (0.1 mol) of pyrrolidine were dissolved in 100 cc of benzene, and the solution was boiled until substantially the calculated amount of water had been split off and collected, yielding a solution of 1-allyl-4-pyrrolidino-1,2,3,6-tetrahydro-pyridine in benzene. The solvent was distilled off, the residue was dissolved in 200 cc of chlorobenzene, 19.3 gm of 2-methyl-6-diethylaminomethylphenol were added thereto, and the mixture was heated for 16 hours on an oil bath (160°–165°C.) while stirring and passing nitrogen through the vessel. Thereafter, the chlorobenzene was distilled off in vacuo, the residue was admixed with 150 cc of 2N hydrochloric acid, and the acid mixture was refluxed for 5 hours. Subsequently, the reaction solution was allowed to cool and was then neutralized with sodium hydroxide. An oily product separated out, which slowly crystallized upon standing. Additional reaction product was recovered from the aqueous phase by ether extraction. 14 gm (54 percent of theory) of 2-allyl-4a-hydroxy-6-methyl-1,2,3,4,4a,10a-hexahydro-(10H)-benzopyrano-[3,2-c]-pyridine, m. p. 99°–101°C. (recrystallized from acetone), of the formula

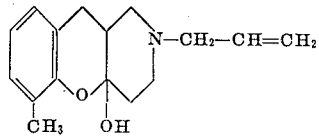

were obtained.

EXAMPLE 2

Preparation of 2-propargyl-4a-hydroxy-6-methyl-1,2,3,4,4a,10a-hexahydro-(10H)-1-benzopyrano-[3,2-c]-pyridine by method B a. 4a-Hydroxy-6-methyl-1,2,3,4,4a,10a-hexahydro-(10H)-1-benzopyrano-[3,2-c]-pyridine A mixture of 19.4 gm (0.1 mol) of 1-acetyl-4-pyrrolidino-1,2,3,6-tetrahydro-pyridine and 19.3 gm (0.1 mol) of 2-methyl-6-diethylaminomethyl-phenol was heated for 8 hours at 150°–160°C. on an oil bath while passing nitrogen through the vessel. Thereafter, 90 cc of 10N hydrochloric acid were added, and the mixture was again heated for 5 hours in an atmosphere of nitrogen. Subsequently, the reaction solution was allowed to cool and was then made alkaline with a saturated aqueous solution of sodium bicarbonate. The alkaline mixture was extracted with chloroform, the extract solution was dried over sodium sulfate, and the chloroform was evaporated, leaving an oily residue which crystallized upon treatment with petroleum ether. 5 gm (23 percent of theory) of 4a-hydroxy-6-methyl-1,2,3,4,4a,10a-hexahydro-(10H)-1-benzopyrano-[3,2-c]-pyridine, m. p. 130°–132°C. (recrystallized from ethylacetate), were obtained.

b. 2-Propargyl-4a-hydroxy-6-methyl-1,2,3,4,4a,10a-hexahydro-(10H)-benzopyrano-[3,2-c]-pyridine A mixture of 21.9 gm (0.1 mol) of 4a-hydroxy-6-methyl-1,2,3,4,4a,10a-hexahydro-(10H)-1-benzopyrano-[3,2-c]-pyridine, 20.8 gm (0.15 mol) of potassium carbonate, 250 cc of acetone and 14.3 gm (0.12 mol) of propargyl bromide was stirred and refluxed for 20 hours. Thereafter, the potassi-um salts formed by the reaction were filtered off and the acetone was distilled out of the filtrate in vacuo, leaving an oily residue which crystallized upon addition of methanol. 18.5 gm (72 percent of theory) of 2-propargyl-4a-hydroxy-6-methyl-1,2,3,4,4a,10a-hexahydro-(10H)-1-benzopyrano-[3,2-c]-pyridine, m. p. 112°–114°C. (recrystallized from methanol), of the formula

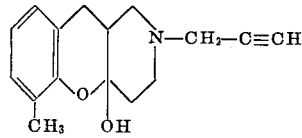

were obtained.

EXAMPLE 3

Preparation of 2-allyl-4a-methoxy-6-methyl-1,2,3,4,4a,10a-hexahydro-(10H)-1-benzopyrano-[3,2-c]-pyridine by methylation of corresponding 4a-hydroxy compound 20 gm (0.077 mol) of 2-allyl-4a-hydroxy-6-methyl-1,2,3,4,4a,10a-hexahydro-(10H)-1-benzopyrano-[3,2-c]-pyridine were added to 600 cc of methanolic 2 percent hydrochloric acid, and the mixture was heated for 5 hours at 100°C. in an autoclave. Thereafter, the reaction mixture was made alkaline with 2N sodium hydroxide and then extracted with ether. The ether was distilled out of the extract solution, leaving 16 gm of an oily residue which was chromatographically separated in a silicagel column. Two isomeric forms of 2-allyl-4a-methoxy-6-methyl-1,2,3,4,4a,10a-hexahydro-(10H)-1-benzopyrano-[3,2-c]-pyridine were obtained, namely: 2 gm (9.5 percent of theory) of one isomer whose hydrochloride had a melting point of 213°–215°C., and 4.5 gm (21.5 percent of theory) of another isomer whose hydrochloride had a melting point of 206°–208°C., both recrystallized from methyl ethyl ketone.

EXAMPLE 4

Using a procedure analogous to that described in Example 1, 38 percent of theory of 2-(β-phenyl-ethyl)-4a-hydroxy-8-methyl-1,2,3,4,4a,10a-hexahydro-(10H)-1-benzopyrano-[3,2-c]-pyridine, m. p. 131°–133°C. (recrystallized from isopropanol), of the formula

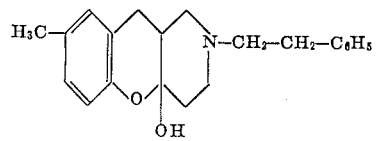

| | |
|---|---|
| N,N,N',N'-tetrakis (2-hydroxypropyl) ethylene diamine dioleate methosulfate | 20 g |
| 96° ethanol | 56 g |
| demineralized water | 523 g |
| Total: | 1,000 g |

Eye-liner for Wick Applicator (Brown Tint)

| | |
|---|---|
| black pigment reduced to microscopic particles | 58 g |
| orange-colored pigment reduced to microscopic particles | 87 g |
| condensate of 10 moles of ethylene oxide on oleic alcohol | 40 g |
| copolymerisate on vinyl-pyrrolidone and vinyl acetate in a ratio of 30% of vinyl-pyrrolidone and 70% of vinyl acetate (in a 50% ethanol solution) | 4 g |
| polyvinyl alcohol solution of a molecular weight equal to 17,500 at 5% in water (solution protected by 0.3% of monochloracetamide | 80 g |
| propylene glycol | 132 g |
| N,N,N',N'-tetrakis (2-hydroxypropyl) ethylene diamine dioleate methosulfate | 20 g |
| 96° ethanol | 56 g |
| demineralized water | 523 g |
| Total: | 1,000 g |

Eye-liner for Wick Applicator (Black Tint)

| | |
|---|---|
| black pigment reduced to microscopic particles | 145 g |
| condensate of 20 moles of ethylene oxide on oleic alcohol | 40 g |
| copolymerisate of vinyl-pyrrolidone and vinyl acetate in a ratio of 30% of vinyl-pyrrolidone and 70% of vinyl acetate (in a 50% ethanol solution) | 4 g |
| polyvinyl alcohol solution with a molecular weight equal to 17,500 at 5% in water (solution protected by 0.3% of monochloracetamide | 80 g |
| propylene glycol | 132 g |
| N,N,N',N'-tetrakis (2-hydroxypropyl) ethylene diamine dioleate methosulfate | 20 g |
| 96° ethanol | 56 g |
| demineralized water | 523 g |
| Total: | 1,000 g |

Eye-liner for Wick Applicator (Raven-Blue Black Tint)

| | |
|---|---|
| black pigment reduced to microscopic particles (iron oxide) | 45 g |
| sky-blue pigment reduced to microscopic particles | 100 g |
| condensate of 20 moles of ethylene oxide on oleic alcohol | 40 g |
| copolymerisate of vinyl-pyrrolidone and vinyl acetate in the ratio of 30% of vinyl-pyrrolidone and 70% of vinyl acetate (in a 50% ethanol solution) | 4 g |
| polyvinyl alcohol solution of a molecular weight equal to 17,500 at 5% in water (solution protected by 0.3% of monochloracetamide) | 80 g |
| propylene glycol | 132 g |
| N,N,N',N'-tetrakis (2-hydroxypropyl) ethylene diamine dioleate methosulfate | 20 g |
| 96° ethanol | 56 g |
| demineralized water | 523 g |
| Total: | 1,000 g |

The following comments should be made about the process of the invention.

There is finally obtained, a colloidal protection and an individual charge of each pigment particle so that the passage of the solid material in suspension in a liquid through porous capillary bodies or communicating cavities is ensured.

That is the reason why a mixed film is made formed of an oxyethylenic ether of the oleic alcohol and a copolymer of vinyl acetate and vinyl-pyrrolidone, the oriented coats (of colloidal type) forming the bond between the mineral pigment and the aqueous phase.

Hydration of this film is accomplished with an aqueous solution of polyvinyl alcohol in a mixture of water and propylene glycol, the progressive bond of the covering of each particle with the aqueous phase being thus ensured.

The alcoholic addition of N,N,N',N'-tetrakis (2-hydroxypropyl) ethylene diamine dioleate methosulfate neutralizes the affinity of the miscellae carrying pigments for the wall of porous bodies utilized as a wick in the applicators.

Without this covering arrangement, the elementary particles of pigment would be speedily agglomerated in the ducts and pores of containers and wicks.

Lastly, the pigment particles deprived of their water absorbent coating would be incapable of rehydrating and putting themselves into circulation independently of each other, in the case when the eye-liner might dry inside the wick of the applicator or on its surface.

The liquid obtained by the process of the invention has the property of passing through the pores or capillaries of the wick of the applicator appliances and not clogging the porous bodies acting as container for the appliance, nor does it deposit itself there, in spite of the actual density of the pigment which is utilized.

It will be obvious to those skilled in the art that various changes may be made without departing from the scope of the invention and the invention is not to be considered limited to what is described in the specification.

What is claimed is:

1. A process for making an eye-liner which will pass through a wick applicator in which finely ground pigments in the order of 1 micron in size are utilized, comprising: coating these pigments with an oxyethylenated fatty alcohol ether selected from the group consisting of oleic, stearic and myristic ethers having 2 – 40 molecules of oxyethylene condensed thereon, at ambient temperature by means of a mixer revolving at high speed during a sufficient time to obtain slightly plastic and shiny pellets; stopping stirring and introducing at ambient temperature a colloidal solution of a vinyl pyrrolidone-vinyl acetate copolymer having 30 – 70 percent vinyl pyrrolidone and having a molecular weight about 40,000 – 360,000, so that said copolymer coacts with the fatty oxyethylenated alcohol ether in making a mixed film surrounding the pigments; mixing at high speed to obtain very shiny and plastic pellets; progressively adding at ambient temperature while stirring a solution in demineralized water of a high molecular weight polyol selected from the group consisting of polyvinyl alcohol having a molecular weight of approximately 17,500, 2,2-dimethylol-propane, triethylene glycol, dipropylene glycol, 2 methyl butyl glycol, and butylene glycol for obtaining a clear liquid mixture; continuing mixing at ambient temperature for a sufficiently long time to allow the mixed coats surrounding each pigment grain to hydrate, progressively binding themselves at the colloidal aqueous phase to obtain a homogeneous suspension free from lumps; progressively adding more demineralized water at ambient temperature; vigorously stirring while adding N,N,N',N'-tetrakis (2-hydroxypropyl) ethylene diamine dioleate methosulfate in solution in 96° ethanol; continuing stirring until the walls of the receptacle that is being used are evenly moistened; allowing the preparation to settle; and decanting floating liquid for use in filling the wick eye-liner applicators.

2. A process according to claim 1 wherein pigments are used ground to such an extent that 90 to 97 percent are of one micron size, then each grain is enveloped in a colloidal protector.

3. A process according to claim 1 further comprising adding propylene glycol to the mixture at the time of adding said high molecular weight polyol.

4. An improved eye-liner resulting from the process according to claim 1 wherein it has the following composition given in grams per 1,000 grams of eye-liner:

35 to 150 g. of pigments fine enough that 90 to 97 percent of them are of one micron size;

8 to 60 g. of a fatty oxyethylenated alcohol ether selected from the group consisting of oleic, stearic and myristic ethers having 2 – 40 molecules oxyethylene condensed thereon;

0.4 to 20 g. of a vinyl pyrrolidone-vinyl acetate copolymer having 30 – 70 percent vinyl pyrrolidone and having a molecular weight about 40,000 – 360,000;

50 to 250 g. of a high molecular weight polyol selected from the group consisting of polyvinyl alcohol having a molecular weight of approximately 17,500, 2,2-diemthylol-propane; triethylene glycol, dipropylene glycol, 2 methyl butyl glycol, and butylene glycol;

0 to 150 g. of propylene glycol;

5 to 25 g. of N,N,N',N'-tetrakis (2-hydroxypropyl) ethylene diamine dioleate methosulfate;

5 to 70 g. of ethanol or isopropanol;

demineralized water of a sufficient quantity for 1,000 g. of composition.

5. A composition in accordance with claim 4 wherein said high molecular weight polyol is polyvinyl alcohol having a molecular weight of approximately 17,500.

* * * * *